April 26, 1927.  1,626,431
J. A. SEEDE
ELECTRIC FURNACE
Filed Dec. 24, 1925
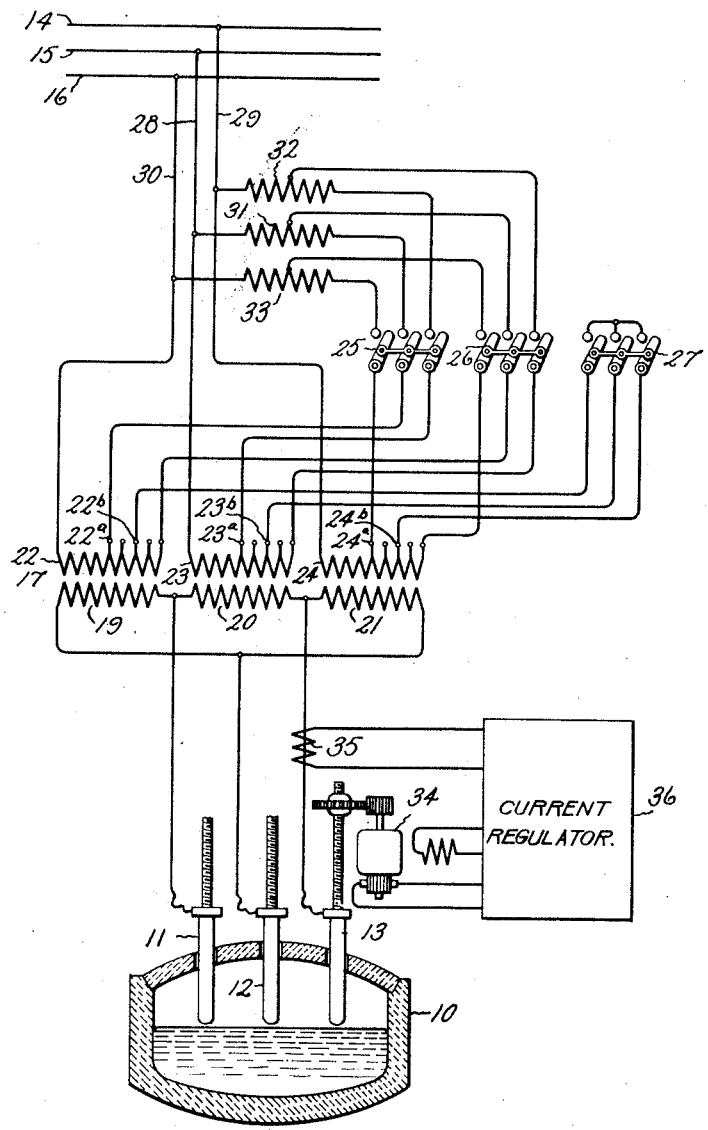
Inventor:
John A. Seede,
by
His Attorney.

Patented Apr. 26, 1927.

1,626,431

UNITED STATES PATENT OFFICE.

JOHN A. SEEDE, OF SCHENECTADY, NEW YORK, ASSIGNOR TO GENERAL ELECTRIC COMPANY, A CORPORATION OF NEW YORK.

ELECTRIC FURNACE.

Application filed December 24, 1925. Serial No. 77,587.

My invention relates to electric furnaces, more particularly to electric furnaces used in the melting and refining of metals, and has for its object the provision of simple and reliable method and means for controlling the furnace as the melting and refining operation proceeds.

My invention relates more specifically to the controlling of arc furnaces in the melting and refining of various metals, such as steel. In the making of steel, for example, the furnace is charged with steel and iron scrap metal which is first melted and then maintained in a molten condition for a short interval during which the metal is analyzed and its chemical content adjusted if necessary. When arc furnaces are used the electrodes penetrate the solid charge during the melting down operation so that the arc is more or less completely surrounded by the charge and its heat is transferred very rapidly to the charge, particularly by radiation. Under these conditions a long arc, producing a high rate of heat generation, may be used. As the charge becomes more and more liquid, however, the arc is gradually uncovered so that more and more of its heat is radiated directly to the interior of the furnace chamber. This intense heat has a very destructive effect on the furnace wall and roof. After the charge has been completely melted, heat need be supplied only at a rate sufficient to supply the losses and maintain the metal molten, or at a somewhat higher rate to raise the temperature of the molten metal. The limitation imposed by the furnace wall, therefore, makes it desirable to shorten the arc, with or without a decrease in the rate of heat generation, as the charge becomes molten so as to decrease the radiation of heat to the furnace wall, and during the refining period a relatively low rate of heat generation should be provided.

In carrying out my invention, I provide means for maintaining a predetermined current through the arc and vary the impressed voltage whereby the arc is automatically varied. In one form of my invention, I apply a high voltage to the arc at the beginning of the melting down period, an intermediate voltage after the metal is partially molten, and a low voltage to maintain the metal molten during the refining period. I also provide reactors for preventing current fluctuations or surges when the maximum and intermediate voltages are being used.

For a more complete understanding of my invention reference should be had to the accompanying drawing, the single figure of which shows in diagrammatic form means for controlling an electric furnace embodying my invention.

Referring to the drawing, I have shown my invention as applied to a three-phase electric arc furnace which is provided with a suitable refractory crucible 10 and three electrodes 11, 12 and 13 which are secured in upright positions and extend downward into the furnace chamber through suitable apertures provided for them in the top of the crucible. Current is supplied to the electrodes from supply mains 14, 15 and 16 leading from a suitable three-phase supply source, a transformer 17 being provided between the supply mains and the furnace. This transformer has three secondary windings 19, 20 and 21 which are permanently connected, preferably in delta relation to the electrodes, and primary windings 22, 23 and 24, the connections of which to the supply mains can be varied by means of suitable switches 25, 26 and 27 to give high, intermediate and low voltages respectively.

The primary windings have one terminal each connected to the supply mains by means of conductors 28, 29 and 30, the connections of their other terminals being controlled by the switches 25, 26 and 27. The primary windings are each provided with five taps by means of which connection is made with the switches 25, 26 and 27. The taps 22$^a$, 23$^a$, and 24$^a$ are shown as connected through the switch 25 in series with the reactance coils 31, 32 and 33 to the conductors 28, 29 and 30 respectively. The switch 26 controls the connections between other selected terminals of the primary windings and intermediate points of the reactance coils, whereby larger portions or as shown the whole of the primary windings are included in the circuit. Other selected taps 22$^b$, 23$^b$ and 24$^b$ on the primary windings are connected to the switch 27, which when closed connects these points of the primary windings with one another.

With this arrangement it will be observed that when the switch 25 is closed to give the high voltage, portions of the three primary windings are connected together in delta, the reactance coils being included in entirety in series with the respective portions of the windings. When the switch 26 is closed to give the intermediate voltage the primary windings are connected in entirety in a delta connection with portions only of the reactance coils included in series with the primary windings respectively. The switch 27 when closed connects portions of the primary windings which are somewhat larger than those connected by the switch 25 in a star connection to give the low voltage. Obviously, different primary taps may be used and the connections between the taps and the switches varied so as to give the desired operating voltages.

I also provide current responsive means for automatically adjusting the vertical positions of the electrodes with respect to the charge so as to maintain a constant current of a desired value in each arc. It is contemplated that separate regulating means will be provided for each electrode and since these three regulating means will be similar in construction only one has been indicated on the drawing, this regulating means being associated with the electrode 13. The electrode 13 may be adjusted in a vertical direction by means of an electric motor 34 which is controlled in response to the current flowing through the electrode, as determined by a current transformer 35, through suitable mechanism 36 which is not shown in detail. This mechanism may, for example, be as described in my Patent No. 1,206,603 dated November 28, 1916.

In the operation of the furnace it will be understood that only one of the switches 25, 26 and 27 will be closed at any one time. To start the furnace the switch 25 is closed whereby the high voltage is applied and since the current in each electrode is automatically maintained at some desired predetermined value for which the regulating mechanism 36 has been previously adjusted, the electrode adjusting mechanism in maintaining this predetermined current with the high voltage applied will adjust the electrodes to form long arcs. After the melting down operation has proceeded to such an extent that the arcs are more or less uncovered so that there is danger of the furnace wall being destroyed, switch 25 will be opened and the switch 26 closed whereby the intermediate voltage is applied. The automatic regulating mechanism then lowers the electrodes to maintain a predetermined current thereby forming shorter arcs. This predetermined current may be the same as previously supplied for the high voltage, or preferably the regulating mechanism is adjusted to maintain a higher current so as to give the same power input as with the higher voltage. The reactance coils 31, 32 and 33 prevent current surges during the melting down period when relatively long arcs are being used.

After the metal has been melted the switch 26 is opened and the switch 27 closed to apply the low voltage, the electrodes then being lowered still more by the automatic regulating mechanism in maintaining a predetermined current so that short arcs are formed. This current may be the same as used with the intermediate voltage, but preferably it is reduced to the same value as used with the high voltage or a smaller value. The refining operation will be carried out with this connection unless a higher rate of heat generation is required to melt additional elements added to the charge or to superheat the charge, in which case the intermediate voltage may be applied.

Various voltages may be used and a voltage will be selected which is best suited to the conditions of operation. With the arrangement of taps shown the high voltage is preferably 165, 156, or 147, the intermediate 147, 138 or 120, and the low 95, 90, 85, 80 or 70.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. The method of melting and refining metals in an electrode furnace which consists in regulating the positions of the electrodes to maintain predetermined currents of different values while applying a high voltage during the initial stage of the melting down period, an intermediate lower voltage to complete the melting down period, and a low voltage for the refining period.

2. The combination with a three-phase electrode furnace, of current responsive means for adjusting the electrodes of said furnace so as to maintain substantially constant currents, means for applying high, intermediate and low voltages to said electrodes to give desired rates of power input during the melting and refining operations, and means for adjusting the current responsive means to maintain a different current for each voltage.

3. The method of melting and refining metals in an electrode furnace which consists in applying a high voltage during the initial stage of the melting down period, an intermediate voltage to complete the melting period, and a low voltage for the refining operation, while at the same time regulating the positions of the electrodes so as to maintain a predetermined current when the high voltage is being applied, a higher predetermined current when the intermediate voltage is being applied, and a lower predetermined current when the low voltage is being applied.

4. The combination with a three-phase electrode furnace, of transformer means for supplying power to said electrodes comprising a set of primary windings and a set of secondary windings, and means for changing the connections of one of said sets of windings to give a high voltage for the initial stage of the melting down period, an intermediate voltage for the completion of the melting down period, and a lower voltage for refining, said high and intermediate voltages being obtained by delta connections and said low voltage being obtained by means of a star connection.

5. The combination with a three-phase electrode furnace, of transformer means for supplying power to said furnace provided with a set of three primary windings, switching means whereby portions of said primary windings may be connected in delta to give a high voltage and larger amounts of said primary windings connected in delta for an intermediate voltage, and switching means whereby portions of said primary windings may be connected in star for a low voltage.

6. The combination with a three-phase electrode furnace, of transformer means for supplying power to said furnace provided with a set of three primary windings, switching means whereby portions of said primary windings may be connected in delta to give a high voltage, and the entire windings connected in delta for an intermediate voltage, and switching means whereby portions of said windings may be connected in star for a low voltage.

7. The combination with a three-phase, electrode furnace, of transformer means for supplying power to said furnace provided with a set of three primary windings, taps on said primary windings, three reactance coils, connections whereby portions of said windings may be connected in delta in series with said reactance coils to give a high voltage during the initial stage of the melting down period, connections whereby larger amounts of said windings may be connected in delta in series with portions of said reactance coils to give an intermediate voltage during the completion of the melting down, and connections whereby portions of said windings may be connected in star to give a low voltage for the refining period.

In witness whereof, I have hereunto set my hand this twenty-third day of December, 1925.

JOHN A. SEEDE.